March 15, 1932.  H. M. STOLLER  1,849,646
MOTOR CONTROL SYSTEM
Filed Oct. 23, 1929
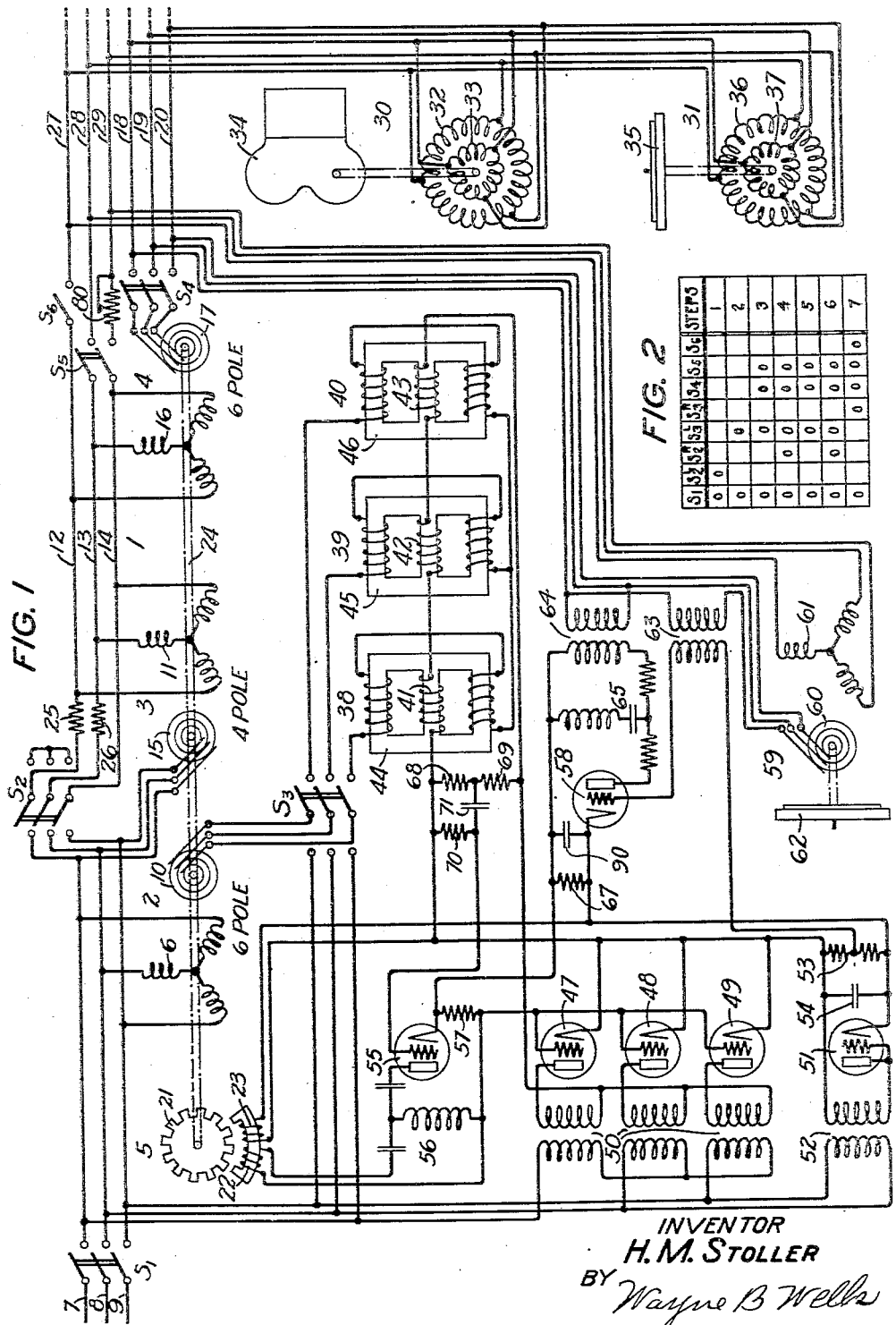
INVENTOR
H. M. STOLLER
BY Wayne B Wells
ATTORNEY Patented Mar. 15, 1932

1,849,646

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

MOTOR CONTROL SYSTEM

Application filed October 23, 1929. Serial No. 401,667.

This invention relates to systems for operating a plurality of motors in synchronism and particularly to control means for governing the starting and acceleration of the motors.

One object of the invention is to provide an improved system for aligning a plurality of service motors with a distributor and for operating the motors in synchronism with the distributor.

Another object of the invention is to provide a control system of the above indicated type that shall have windings of the distributor and the service motors connected to a polyphase supply circuit in a manner to increase the frequency of the current, and that shall operate the distributor by a motor connected to the polyphase supply circuit.

Another object of the invention is to provide a control system with a distributor having a plurality of electrically interlocked service motors connected thereto and a propelling motor for operating the distributor that shall control the rate of the propelling motor acceleration according to the operation of the distributor and that shall limit the acceleration of the propelling motor in an improved manner.

A further object of the invention is to provide a distributor set operated from a polyphase supply circuit and comprising a propelling motor, a frequency booster and a distributor having service motors interlocked therewith that shall position the distributor set in a starting position in an improved manner and align the service motors with the distributor set.

In recording sound pictures it is essential to operate a number of service motors which control the cameras and the sound recording machines in synchronism and to insure the starting of the service motors from a set position. The interlocked service motors must be aligned with a distributor before operation thereof and the aligning operation must be effected in a manner to prevent injury to the apparatus operated by the service motors. Moreover, the distributor should be placed in a set position before aligning and operating the service motors and should be accelerated and have the speed thereof controlled to prevent injury to the apparatus operated by the service motors.

In the disclosed system a distributor set comprising an induction motor, a frequency booster and a distributor is operated from a polyphase supply circuit for controlling the interlocked service motors which operate the cameras and sound recording machines. The distributor set is of such size and construction as not to be materially affected by the load placed thereon. The service motors, each of which has a polyphase rotor winding and a polyphase stator winding, are connected to the distributor in the manner disclosed in the application of E. R. Morton, Serial No. 306,821, filed September 19, 1928. The distributor stator winding in place of being connected to the polyphase supply circuit directly as in the system disclosed in the application of E. R. Morton is connected to the polyphase supply circuit through the frequency booster in order to have a current of a higher frequency impressed thereon and improve the operation of the system.

The induction motor employed in the distributor set has a wound polyphase rotor and is positioned in a set equilibrium position prior to the aligning of the service motors with the distributor. The frequency booster has a less number of poles than the induction motor and is utilized for positioning the induction motor in equilibrium starting position. In placing the induction motor in starting position, the stator and rotor windings of the frequency booster are connected to the polyphase supply circuit. The rotors of the induction motor, frequency booster and distributor are mechanically connected together with the dead centers of the motor and booster out of alignment and inasmuch as the frequency booster has a different number of poles than the induction motor, it is apparent that the frequency booster may be positioned on electrical dead center or in its position of equilibrium with the rotor of the induction motor not on an electrical dead center. The stator or the rotor winding of the induction motor is then connected to the polyphase supply circuit for moving the rotor to equilibrium starting position.

Alignment of the service motor rotors with the rotor of the distributor is effected by impressing a single phase current through a resistance element on the rotor windings of the service motors. The resistance element in the single phase circuit insures against any violent shock on the apparatus connected to any of the service motors. At this time the rotor of the distributor is oscillated through a limited angle to effect control of the service motor rotors even if some of them be placed on an electrical dead center. The oscillation of the distributor rotor is effected by connecting three of the four windings of the induction motor and the frequency booster to the polyphase supply circuit and intermittently connecting the fourth winding to the supply circuit. The oscillating movement of the distributor rotor is continued while gradually excluding the resistance element from the single phase aligning circuit.

The acceleration of the induction motor is not only limited but the rate of acceleration of such motor is controlled to insure against injury to any of the apparatus connected to the service motor. The motor is controlled by three induction reactors of the type disclosed in the patent to H. M. Stoller 1,695,035 dated December 11, 1928. The alternating current windings of the induction reactors are connected to the polyphase rotor winding of the induction motor and the direct current windings of the reactors are each supplied with direct current by means of thermionic rectifiers connected to the polyphase supply circuit. The grid elements of the thermionic rectifiers are controlled to govern the impedance of the inductive reactors and according to control the acceleration and the speed of the induction motor.

An auxiliary service motor electrically interlocked with the distributor is provided with a flywheel load and controls a thermionic phase detector tube to govern the rectifying means and insure a fixed rate of acceleration by the induction motor. The acceleration of the motor is so controlled as to effect a slow rate at starting, a fast intermediate rate and a slow rate near the end of the acceleration period. Plate potential for the thermionic phase detector tube is obtained from one phase of the auxiliary service motor rotor winding circuit and grid potential is obtained in accordance with the current flowing through such phase winding of the rotor of the auxiliary service motor.

A pilot generator which is directly connected to the induction motor governs a thermionic tube for controlling the rectifying means to limit the acceleration of the induction motor. A delayed feed back on the grid of the thermionic tube controlled by the pilot generator is provided for stabilizing the regulating operation and accordingly the speed of the motor. The delayed feed back circuit is of the type disclosed in the patent to H. M. Stoller 1,662,085, dated March 13, 1928.

The term "synchronous" when used in describing the operation of the motors in this system is to be understood as referring to the synchronous operation of the motors with respect to each other and not to the synchronous operation of the motors with respect to the frequency of any source of current.

In the accompanying drawings Fig. 1 is a diagrammatic view of a motor control system constructed in accordance with the invention;

Fig. 2 is a chart illustrating the sequence of operation of the switches shown in Fig. 1 of the drawings.

Referring to Fig. 1 of the drawings a distributor set 1 is shown comprising a motor 2, a frequency booster 3, a distributor 4 and a pilot generator 5. The motor 2, which is of the induction type, comprises a three-phase stator winding 6 connected to supply conductors 7, 8 and 9 and a three-phase rotor winding 10. A switch S1 is preferably provided in the connection between the stator winding 6 and the supply conductors 7, 8 and 9.

The frequency booster 3 comprises a three-phase stator winding 11, which is connected to the stator bus connectors 12, 13 and 14, and a three-phase rotor winding 15 which is connected to the supply conductors 7, 8 and 9. The distributor 4 comprises a three-phase stator winding 16, which is connected to the stator bus conductors 12, 13 and 14, and a three-phase rotor winding 17 which is connected by a switch S4 to the rotor bus conductors 18, 19 and 20. The pilot generator 5 comprises a toothed rotor 21, an armature winding 22 and a field winding 23.

The rotors of the motor 2, the frequency booster 3, the distributor 4 and the pilot generator 5 are mounted fixedly on a shaft 24. The rotors of the motor and the booster are positioned on the shaft so that the dead centers of the motor and the booster are not in the same angular position. It is to be understood if so desired the rotors of such machines may be mechanically connected together in any other suitable manner. The motor 2 and the distributor 4 are six-pole machines, whereas the frequency booster 3 is a four-pole machine. The utility of providing the frequency booster with a different number of poles will be explained when reference is made to the aligning operation.

A three-pole double-throw switch S2 is provided either for connecting the stator winding of the frequency booster 3 through resistance elements 25 and 26 to the suppy conductors 7, 8 and 9 or for closing the stator winding circuit of the frequency generator and distributor through the resistance elements 25 and 26. Switches S5 and S6 are provided for connecting service-motor bus conductors 27, 28 and 29 to the stator bus conductors 12, 13 and 14.

The distributor 4 controls a number of service motors, only two of which, 30 and 31, are shown on the drawing. The motor 30 comprises a three-phase stator winding 32 which is connected to the service-motor bus conductors 27, 28 and 29 and a rotor winding 33 which is connected to the rotor bus conductors 18, 19 and 20. The motor 30 is illustrated connected to a camera 34. The service motor 31, which is shown connected to a sound recording machine 35, comprises a stator winding 36 and a rotor winding 37. The stator winding 36 is connected to the service-motor bus conductors 27, 28 and 29. The rotor winding 37 is connected to the rotor bus conductors 18, 19 and 20. It is to be understood that the number of service motors interlocked with the distributor 4 may be varied as desired.

A three-pole double-throw switch S3 is provided for connecting the rotor winding 10 of the motor 2 either to the supply conductors 7, 8 and 9 or to three inductive reactors 38, 39 and 40. The inductive reactors 38, 39 and 40 each are provided with two alternating current windings adapted to be connected in the circuit of the rotor winding 10. The reactors are also provided with direct current windings 41, 42 and 43. The A. C. and D. C. windings of the reactors 38, 39 and 40 are respectively mounted on core members 44, 45 and 46. The current flow through the direct current windings 41, 42 and 43 of the reactors 38, 39 and 40 is controlled by three rectifier tubes 47, 48 and 49 which are connected to the three-phase supply circuit comprising conductors 7, 8 and 9 by transformers 50. A rectifier tube 51, which is connected to the supply conductors 8 and 9 by means of a transformer 52, supplies rectified current to the field winding 23 of the pilot generator 5 and biasing potential to the grids of the rectifier tubes 47, 48 and 49. A potentiometer 53 in the circuit of the rectifier tube 51 has a condenser 54 connected across the terminals thereof in order to smooth out ripples in the rectified current.

A thermionic detector tube 55 is connected to the armature winding 22 of the pilot generator 5 by means of a high pass filter 56. A resistance element 57 in the circuit of the detector tube 55 impresses negative biasing potential on the circuit of the grids of the rectifier tubes 47, 48 and 49 for limiting and controlling the speed of the distributor set 1.

A thermionic phase detector tube 58 is provided for controlling the rate of acceleration of the distributor set. A control motor 59 having a rotor winding 60 connected to the rotor bus conductors 18, 19 and 20 and a stator winding 61 connected to the service-motor bus conductors 27, 28 and 29 is provided for governing the operation of the phase detector tube 58. The control motor 59 is provided with a heavy damped flywheel 62 and has no steady set load.

A transformer 63 is provided for supplying the grid of the phase detector tube 58 with potential which varies according to the current flowing through the rotor winding 60 of the control motor 59. A transformer 64, which is connected across one phase of the rotor buses 18 and 19, is provided for supplying potential to the plate of the phase detector tube. An attenuation network 65 is provided in the connection between the phase detector tube 58 and the transformer 64 for obtaining a slow rate of acceleration at the start of accelerating the distributor set, a rapid acceleration intermediate rate and a slow rate near the end of the accelerating period of the distributor set.

The output circuit of the phase detector tube 58 is connected across a coupling resistance element 67. The resistance element 67 is in the grid circuit for the rectifier tubes 47, 48 and 49 and in the same manner as the resistance element 57 applies a negative biasing potential on the grids of the rectifier tubes 47, 48 and 49 in opposition to the positive potential impressed on such grids by the potentiometer 53. A condenser 90 is provided for smoothing out ripples in the current supplied to the coupling resistance 67.

A feed back network comprising resistance elements 68, 69 and 70 and a condenser 71 is provided for effecting a delayed feed back on the grid of the detector tube 55 to stabilize the regulating operation in the manner disclosed in the beforementioned patent to H. M. Stoller 1,662,085, dated March 13, 1928.

The distributor set 1 is aligned by closing switch S1 and the switch S2 in its left hand position as viewed in the drawing. The frequency booster 3 has its stator winding 11 connected to the supply circuit through the resistance elements 25 and 26 and its rotor winding 15 directly connected to the supply conductors. The resistance elements 25 and 26 serve to limit the current that may flow through the stator winding. If the frequency booster is not on an electrical dead center it will turn the entire set through a small angle to its electrical equilibrium position. It is, of course, apparent that if it is on its electrical dead center, no movement at all of the distributor set will take place. The switch S2 is then opened and the switch S3 is closed in its position towards the left, as viewed in Fig. 1 of the drawings. The motor 2 now has its stator winding 6 and its rotor winding 10 directly connected to supply conductors 7, 8 and 9. Care is taken to mount the rotors of the motor and the booster on the shaft 24 so that the dead centers of the motor and the booster are not aligned. Inasmuch as the motor 2 is provided with six poles and the frequency booster 3 is only provided with four poles, there is no possibility of the motor 2 being on an electrical dead center after the first aligning step has taken place, namely, the positioning of the frequency booster either on its electrical dead center or in its position of electrical equilibrium.

After completing the positioning of the distributor set the third step in operating the motor system is effected by closing the switches S1, S3 towards the left as viewed in Fig. 1 of the drawings, S4 and S5. The switch S4 connects the three-phase distributor rotor winding to the three-phase rotor windings of the various service motors connected to the cameras and the sound recording machines. The switch S5 completes a single phase circuit through the stator windings of the various service motors through an adjustable resistance element 80. The resistance element 80 is set initially at a very high value in order to limit the interlocking current and prevent any violent angular movements by the service motors which are lightly loaded. The lightly loaded service motors will move into proper alignment with the distributor 4 immediately. The heavier loaded service motors, however, will not come into alignment until the value of the resistance element 80 included in the single phase circuit has been reduced.

The switch S2 is now closed towards the right as viewed in Fig. 1 of the drawings to close the stator winding circuit of the frequency booster 3 through resistance elements 25 and 26. The switches S1, S3, S4 and S5 remain closed. The frequency booster 3 now operates as an induction motor developing torque and will turn through a phase angle probably from 20 to 30 electrical degrees until the motor 2 which is interlocked on the line has built up a counter-torque equal to the torque developed by the frequency booster. This angular movement of the distributor set will tend to break out of dead center any of the service motors connected to the distributor stator and rotor windings. The switch S2 is then opened to remove the torque of the frequency booster 3 and permitting the motor 2 to turn the distributor set back to its original equilibrium position. A portion of the resistance element 80 is cut out of the single phase circuit and switch S2 is closed towards the right as viewed in Fig. 1 of the drawings.

The above operation is repeated intermittently while the resistance element 80 is being excluded from the single phase aligning circuit. When the resistance element 80 is entirely out of the single phase circuit, full interlocking torque has been applied to the service motors and all motors have been broken out of dead center. Moreover, the equilibrium position of all service motors and the distributor will be identical. The switch S6 is then closed thereby applying three phase interlocking current between the distributor 4 and the service motors. The switch S2 is opened and the switch S3 is closed towards the right as viewed in Fig. 1 of the drawing.

When the switches S1, S3, S4, S5 and S6 are closed as above set forth, the distributor set will accelerate to full speed under the control of the inductive reactors 38, 39 and 40. At the start of the acceleration period a resultant positive potential from the potentiometer 53 will be impressed on the grids of the rectifier tubes 47, 48 and 49. Since the grid elements of the rectifier tubes 47, 48 and 49 are positive, a large direct current will flow through the rectifier tubes 47, 48 and 49 and the direct current windings 41, 42 and 43 of the inductive reactors 38, 39 and 40. This will insure minimum impedance for the rotor circuit of the motor 2 and also insure developing torque to accelerate the distributor set.

The rate of acceleration, however, will be controlled by the phase detector tube 58. If the acceleration rate is raised above a predetermined value, a potential is impressed on the resistance element 67 in the output circuit of the phase detector tube 58 to impress a negative potential upon the grids of the rectifier tubes 47, 48 and 49. This reduces the rectified current and the direct current flow through the windings 41, 42 and 43 of the inductive reactors 38, 39 and 40. When the rate of acceleration is raised above a predetermined value, sufficient current will flow through the rotor circuit of the control motor 59 to drive the grid of the phase detector tube 58 positive at the same portion of the half wave as the plate of the phase detector tube 58 is positive. This will cause the phase detector tube to pass current through the resistance element 67. The potential drop across the resistance element 67 tends to impress a negative potential on the grids of the rectifier tubes 47, 48 and 49 for limiting the rate of acceleration.

The distributor set continues to accelerate throughout the accelerating period at rates determined by the frequency characteristic of the attenuation network 65. The attenuation network 65 permits a slow rate of acceleration at the start of the acceleration period, then a rapid acceleration rate and finally a slow rate near the end of the acceleration period. This is accomplished by having the attenuation network tuned to a current having a frequency of 43 cycles. At the beginning of the acceleration period the frequency of the current in the rotor bus circuit will be approximately 50 cycles and at the end of the acceleration period the frequency of the current in the rotor bus conductors will be approximately 36.7 cycles. When full operating speed of the distributor set is reached, which in the system under discussion is approximately 800 RPM. the high pass filters 56 in the plate circuit of the detector tube 55 passes sufficient current to cause a potential drop across the coupling resistance 57. This will impress or tend to impress a negative potential on the grids of the rectifier tubes 47, 48 and 49 to limit the direct current flow through the windings 41, 42 and 43 of the inductive reactors 38, 39 and 40. Thus further acceleration of the distributor set is prevented. The detector tube 55 also serves to maintain the speed of the distributor set substantially constant. A delayed feed back on the detector tube 55 is provided by the resistance elements 68, 69 and 70 and condenser 71. As before set forth the operation of the delayed feed back is disclosed in the patent to H. M. Stoller 1,662,085.

In the system above described it is assumed that the supply conductors 7, 8 and 9 have a 50 cycle three-phase current impressed thereon and that the stator bus conductors 12, 13 and 14 have a current of 76.7 cycles impressed thereon at approximately 275 volts. The service motor bus conductors 17, 18, 19 and 20 are assumed to have a current of 36.7 cycles impressed thereon at about 96 volts. The speed of the distributor set is assumed to be about 800 revolutions per minute. It may be noted that the frequency booster 3 acts to a certain extent as a generator and imposes additional load on the motor 2. This additional load serves to insure against any possibility of the torque on the system reversing and tending to drive the motor 2 as a generator. Accordingly, it is permissible to make the motor 2 of the induction type and control it by the variable reactors 38, 39 and 40. Although the distributor windings and the rotor windings of the various induction motors have been shown connected together in various set relationships, it is to be understood in accordance with well-known practices that the rotor circuits and stator circuits may be interchanged if so desired.

Modifications in the system and in the arrangement and location of parts may be made within the spirit and scope of the invention and such modifications are intended to be covered by the appended claims.

What is claimed is:

1. In a motor system, a distributor having polyphase rotor and stator windings, a plurality of service motors having polyphase rotor and stator windings connected in parallel to the rotor and stator windings of the distributor, means for supplying polyphase current to one winding of the distributor and each of the service motors, a main alternating current motor directly connected to said distributor, and means controlled from the distributor rotor circuit for governing the rate of acceleration of the main motor.

2. In a motor system, a polyphase motor having rotor and stator windings, a frequency booster having rotor and stator windings, a distributor having rotor and stator windings, the rotors of the motors, the booster and the distributor being mechanically connected together, a polyphase supply circuit connected to the motor stator winding and the booster rotor winding, the booster stator winding and the distributor stator winding being connected together, and a plurality of service motors having rotor windings connected in parallel to the distributor rotor winding and stator windings connected in parallel to the booster stator winding.

3. In a motor system, a distributor having rotor and stator windings, a plurality of service motors having rotor and stator windings connected in parallel to the rotor and stator windings of the distributor, a main motor having rotor and stator windings for operating said distributor, said motor stator winding being connected to a polyphase supply circuit, means comprising a frequency booster for connecting the distributor stator winding to the polyphase supply circuit, and means for controlling the motor rotor winding to govern the rate of the main motor acceleration and to limit the main motor acceleration.

4. In a motor system, a distributor having polyphase rotor and stator windings, a plurality of service motors having polyphase rotor and stator windings connected in parallel to the rotor and stator windings of the distributor, means for supplying polyphase current to the stator windings of the distributor and the service motors, a main motor having rotor and stator windings and connected to a polyphase supply circuit for operating said distributor, and means comprising switches and circuits controlled thereby for setting the rotors of the main motor, the distributor, and the service motors in predetermined position prior to operation thereof.

5. In a motor system, a distributor having polyphase rotor and stator windings, a plurality of service motors having polyphase rotor and stator windings connected in parallel to the rotor and stator windings of the distributor, means for impressing a single phase current on the stator windings of the service motors and a three-phase current on the distributor stator winding and for oscillating the distributor rotor through a small angle to align the service motors' rotors with the distributor rotor in fixed position, and means for rotating the distributor rotor while impressing a polyphase current on the stator windings of the distributor and the service motors.

6. In a motor system, a distributor having polyphase rotor and stator windings, a plurality of service motors having polyphase rotor and stator windings connected in parallel to the rotor and stator windings of the distributor, means for positioning the distributor in a set starting position, means for impressing a single phase current on the stator windings of the service motors and a three-phase current on the distributor stator winding and for oscillating the distributor rotor through a small angle to align the service motor rotors with the distributor rotor, and means for supplying polyphase current to one winding of the distributor and each of the service motors.

7. In a motor system for oscillating a distributor having rotor and stator windings, a propelling motor and a frequency booster each having polyphase stator and rotor windings, means for mechanically connecting the rotors of the motor and the booster to the distributor rotor with the dead centers of the motor and booster unaligned, and means for connecting three of the windings of the motor and booster to a polyphase supply circuit while intermittently connecting the fourth winding of the motor and booster to the polyphase supply circuit to oscillate the distributor rotor through a small angle.

8. In a motor system for oscillating a distributor having rotor and stator windings, a propelling motor and a frequency booster each having polyphase stator and rotor windings, means for mechanically connecting the rotors of the motor and the booster to the distributor rotor with the dead centers of the motor and booster unaligned, a polyphase supply circuit connected to the motor stator winding and the booster rotor winding, and means for connecting the motor stator winding to the polyphase supply circuit while intermittently connecting the booster stator winding to the polyphase supply circuit to oscillate the distributor rotor through a small angle.

9. In a motor system, a distributor set comprising a propelling motor, a frequency booster, and a distributor each having polyphase stator and rotor windings, means for mechanically connecting the rotors of the propelling motor, the booster and the distributor with the dead centers of the motor and booster unaligned, the stator windings of the booster and distributor being connected in parallel, a plurality of service motors having polyphase stator and rotor windings respectively connected in parallel to the stator and rotor windings of the distributor, a resistance element, and means for connecting three of the windings of the propelling motor and the booster to a polyphase supply circuit while intermittently connecting a fourth winding of the propelling motor and booster to the polyphase supply circuit, connecting a single phase current through said resistance element to the stator windings of the service motors and gradually excluding the resistance element from circuit to align the rotors of the service motors, and for operating the propelling motor from the polyphase supply circuit while connecting the booster rotor winding to the polyphase supply circuit.

10. In a motor system, a distributor set connected to a polyphase supply circuit and comprising a motor, a frequency booster and a distributor each having interconnected rotor and stator windings, impedance control means in the rotor circuit of the motor, means controlled by said distributor for governing said impedance means to control the rate of the motor acceleration, and means for controlling said impedance means to limit the motor acceleration.

11. In a motor system, a distributor set connected to a polyphase supply circuit, said set comprising a motor, and a distributor having rotors mechanically connected together, impedance control means in the rotor circuit of the motor, means controlled by said distributor for governing said impedance means to control the rate of the motor acceleration, and means for controlling said impedance means to limit the motor acceleration and govern the motor speed.

12. In a motor system, a motor connected to a polyphase supply circuit and having stator and rotor windings, impedance means having alternating current windings in the motor rotor circuit and direct current windings for controlling the impedance of the motor rotor circuit, rectifier means for supplying direct current to said direct current windings from the polyphase supply circuit, a distributor having rotor and stator windings, the distributor rotor being mechanically connected to the motor rotor, means comprising an auxiliary dynamo electric machine controlled by said distributor to govern said rectifying means and control the rate of acceleration of the motor, and means comprising a pilot generator operated by the motor for controlling the rectifying means to govern the motor speed.

13. In a motor system, a polyphase motor having rotor and stator windings, a frequency booster having rotor and stator windings, a distributor having rotor and stator windings, the rotors of said motor, booster and distributor being mechanically connected together, a polyphase supply circuit connected to the motor stator winding and booster rotor winding, the booster stator winding and the distributor stator winding being connected together, reactance elements in the circuit of the rotor winding of the motor, means connected to the rotor circuit of said distributor for governing the reactance element to control the motor acceleration, and means for governing the motor speed.

14. In a motor system, a polyphase motor having rotor and stator windings, a frequency booster having rotor and stator windings, a distributor having rotor and stator windings, the rotors of the motor, the booster and the distributor being mechanically connected together, a polyphase supply circuit connected to the motor stator winding and the booster rotor winding, the booster stator winding and the distributor stator winding being connected together, reactance elements in the circuit of the motor rotor winding, means comprising a control machine having a stator winding connected to the distributor stator winding and a rotor winding connected to the distributor rotor winding for governing said reactance elements to control the motor acceleration, and means for limiting the motor acceleration.

15. In a control system, a motor, means for operating said motor from a supply circuit, and means comprising a three element thermionic tube and an attenuation device for insuring a slow acceleration rate at the start of the motor acceleration period, a fast intermediate acceleration rate and a slow acceleration rate near the end of the acceleration period.

16. In a control system, a motor having polyphase stator and rotor windings, induction reactors in the circuit of said rotor winding, means comprising a thermionic phase detector tube for controlling said induction reactors to govern the motor acceleration, means for impressing alternating potential on the grid and the plate of said tube and for varying the phase relation between the potentials on the grid and plate according to the rate of acceleration of said motor, and attenuation means in the plate circuit of said tube to insure a slow acceleration rate when starting the motor acceleration, a fast intermediate acceleration rate and a slow acceleration rate near the end of the acceleration period.

17. In a control system, a motor having polyphase stator and rotor windings, impedance means in the rotor winding circuit for controlling the operation of the motor, means comprising a space discharge tube for controlling said impedance means and means automatically governed according to the operation of said motor for controlling said tube to govern the acceleration rate of the motor.

18. In a control system, a motor having polyphase stator and rotor windings, impedance means in the rotor winding circuit for controlling the operation of the motor, means for operating the motor from a polyphase supply circuit, and means comprising an electric space discharge device and an attenuation device for controlling said impedance means to insure a slow acceleration rate at the start of the motor acceleration period, a fast intermediate acceleration rate and a slow acceleration rate near the end of the acceleration period.

19. In a motor system, a distributor having polyphase rotor and stator windings, a plurality of service motors having polyphase rotor and stator windings connected in parallel to the rotor and stator windings of the distributor, means for supplying polyphase current to one winding of the distributor and each of the service motors, a main motor directly connected to said distributor, and means controlled from the distributor rotor circuit for governing the rate of acceleration of the main motor.

In witness whereof, I hereunto subscribe my name this 21 day of October, 1929.

HUGH M. STOLLER.